RADIO COMMUNICATION SYSTEM FOR CONTROL OF LOCOMOTIVES

Filed Sept. 23, 1963 2 Sheets-Sheet 1

INVENTOR.
H.W.PATTERSON
BY Forest B. Hitchcock
HIS ATTORNEY

Dec. 20, 1966 H. W. PATTERSON 3,293,549

RADIO COMMUNICATION SYSTEM FOR CONTROL OF LOCOMOTIVES

Filed Sept. 23, 1963 2 Sheets-Sheet 2

INVENTOR.
H.W. PATTERSON
BY
Forest B. Hitchcock
HIS ATTORNEY

United States Patent Office 3,293,549
Patented Dec. 20, 1966

3,293,549
RADIO COMMUNICATION SYSTEM FOR CONTROL OF LOCOMOTIVES

Herbert W. Patterson, Victor, N.Y., assignor to The General Signal Corporation, Rochester, N.Y., a corporation of New York Filed Sept. 23, 1963, Ser. No. 310,812
4 Claims. (Cl. 325—64)

The present invention relates to an improved method of keying a transmitter by using living heart beats to produce modulated bursts of information repetitively at varying rates of occurrence, and more particularly to an improved method of keying the transmitters of a plurality of independent transmitter-receiver combinations in the same given area over a single carrier frequency by using a different living heart beat for each transmitter to reduce the probability of interference between transmitters because of the simultaneous transmission of information pulses.

Specifically, the present invention relates to an improved method and apparatus for controlling remotely over a single carrier frequency a plurality of vehicles operating in close proximity to one another by using living heart beats to control the rate of occurrence of modulated bursts of carrier frequency, whereby the control of the vehicles is accomplished by the effective reception of these frequency modulated bursts within predetermined time limits.

The remote control of vehicles has many applications in industrial and transit operations. However, in applications where each vehicle requires its own operator and several vehicles must operate in the same general area, independent remote control of these vehicles has had some practical limitations. For example, because the radio spectrum is highly utilized, an individual carrier frequency for each of plurality of transmitter receiver-combination can rarely be allocated to a single user. Also, the use of a common carrier frequency for control of all the receiving stations presents serious interference problems.

To overcome the problem of interference in utilizing a single frequency for communication between a plurality of transmitter receiver combinations, it has heretofore been proposed to utilize a system wherein each transmitter-receiver combination shares time with the other transmitter-receiver combinations of the system. In this proposed system, short bursts of information are transmitted within specified time limits. Each burst is comprised of a plurality of modulating frequencies superimposed on the single carrier frequency. The particular combination of modulating frequencies includes an address and a control, so that each vehicle effectively receives the command information transmitted by its associated transmitter only. Each transmitter is active or in other words on the air for a small fraction of a second. Thus, there is sufficient time for all of the transmitters to transmit the short bursts of information without interference. In order to reduce the probability of two or more transmitters from transmitting their information at the same time, the pulse or burst repetition rates of each transmitter are made random or non-synchronous in time. This heretofore proposed system is so organized that in the event two information burst are transmitted simultaneously, and the transmitters and receivers are in such a position as to cause interference, each receiver rejects the information in order to avoid erroneous operation. In order that this prior system is fail-safe, the absence of the effective reception of an information burst for a certain period of time which is three seconds for example is interpreted on the vehicle as a stop command.

Proposed systems of the type described are reliable in their operation, and effectively control a large number of vehicles operating within the same general area. However, one of the critical components in the successful operation of such a system, is a random pulse generator, which is relatively complicated and expensive in its construction, particularly when it is required to key a transmitter in such a manner that the transmitter is not keyed too frequently, and within specified time limits. If each transmitter of the system is keyed more frequently than is necessary, there is more opportunity for interference; and at least one non-interfering burst must be received within the specified time period to prevent the erroneous stopping of the controlled vehicle.

In systems of the type proposed, each transmitting apparatus may be in the form of a small pack that is worn on the operators back, for example, which permits him freedom of action as he moves from place to place in controlling the operation of his vehicle. A small hand-held device, which has a plurality of buttons or levers is connected to the transmitting apparatus to selectively modulate the carrier with the control tones. At times, the operator is controlling the vehicle while running along side, or standing at some vantage point so that he can view its operation with respect to another object, such as unloading, or in close traffic conditions, or at other times he may even be engaged in another minor activity in conjunction with the operation of the vehicle. In these systems, it is not only important that the controlled vehicle come to a stop in the event of loss of effective communication, but also that every provision be made to insure that the vehicle is not erroneously controlled, which could occur if unauthorized personnel operate the levers when the apparatus is not in use, or the operator should suffer a fatal attack while controlling the vehicle.

The purpose of the present invention is to provide a method and apparatus for remotely operating a vehicle in accordance with the proposed system hereinbefore described which eliminates the need for an electronic pulse generator for keying its transmitter within predetermined time periods, and insures that the vehicle is not inadvertently controlled when the apparatus is not in place on the person of an operator, or if the operator should die while controlling his vehicle.

In furtherance thereof and in carrying out the objects hereinafter set forth, the present invention provides an improved system of the type hereinbefore described using apparatus which is fastened to the operator to detect his heart beats, and employing these heart beats to produce an electrical pulse for keying the transmitting apparatus to transmit the modulated carrier in response to each beat. This may be accomplished by fastening a pick-up device or transducer to his chest, back, wrist, or any other convenient place where each heart beat of the individual may be detected and converted to a pulse of electrical energy. The heartbeat rate of different individuals varies depending upon their age, weight, condition of health, all of which affects their basal metabolism. In addition, the rate of heartbeat of each individual is accelerating and decelerating. Changes in temperature, nervous stimuli, anger, happiness, and degrees of exertion all affect the rate of his heartbeat. For example, if an individual is standing still and then begins to move his heartbeat rate is accelerating. If he stands still after exertion, the rate is decelerating. Thus an individual operator who is constantly in motion in varying degrees has a heartbeat rate that is constantly accelerating and decelerating. The average rate of an individual heartbeat is between 60 and 80 times per minute or from once every second to once every ¾ of a second. During exertion, this rate may increase to more than 100 times per minute which would be more than once every 6/10 of a second. Thus, not only would the keying rate of each operator be basically different, but the keying rate for each individual operator would accelerate and decelerate from once every second to once every $\frac{9}{10}$ of a second, for example, all of which would reduce the probability of interference by reason of two beats occurring simultaneously within a specified time limit. One practical time limit for the effective reception of a tone modulated burst before the vehicle comes to a stop in the proposed system is approximately 3 seconds. Thus, each transmitter is keyed from 2 to 3 times in this period, which would permit proper operation, if at least one of the keying pulses were non-interfering with the keying pulse of another transmitter-receiver combination.

By using the method and apparatus according to the present invention, a person who happened upon a transmitting apparatus which was unattended in the vicinity of the system could not erroneously move the vehicle by operating the levers and buttons of the hand controlled device. The transmitter cannot be keyed unless the pick-up device is properly positioned to detect the living heartbeats. Also, if the operator should die, the keying of the transmitter ceases and the vehicle comes to a stop.

One of the objects of the present invention is to provide an improved method of keying a transmitter to produce periodic short pulses of information periodically at varying rates and within a predetermined minimum rate by using a living heartbeat to control the rate of keying.

Another object of the invention is to provide an improved method for keying a plurality of transmitters nonsynchronously and at random rates by using a different living heartbeat to key each individual transmitter thereby reducing the probability of the simultaneous transmission of interfering pulses.

A further object of this invention is to provide an improved method and apparatus for the remote control of a plurality of objects in the same general area over a single carrier frequency by using the heartbeat of each individual operator to key the transmitter for controlling his particular object, wherein each individual transmitter must be keyed and effective reception had within predetermined time limits to maintain effective control thereof.

Other objects of this invention will become apparent from the specification, the drawings, and the appended claims.

Figures 1, 2, 3:
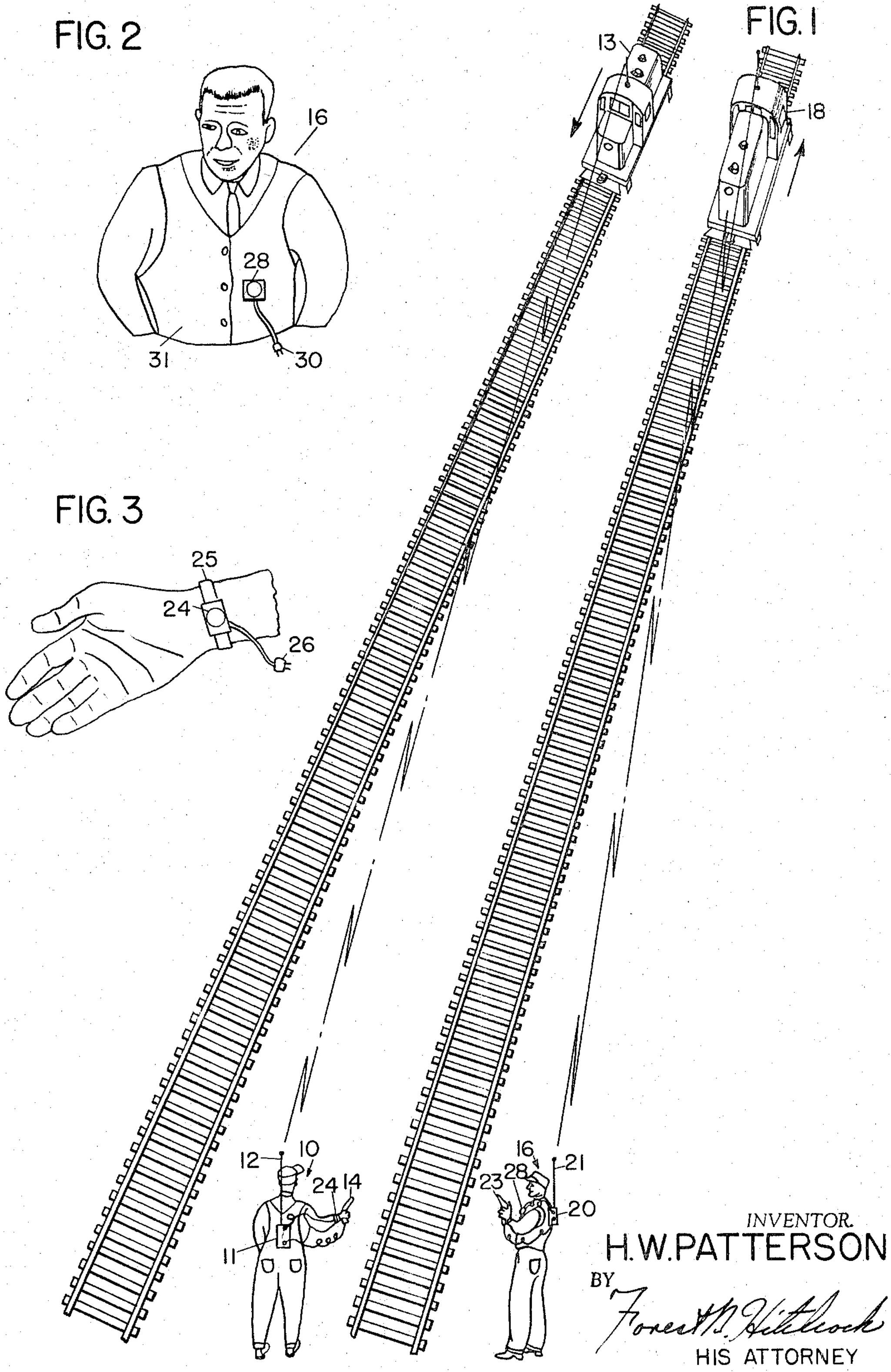
FIG. 1 is a view illustrating two locomotives, each being remotely controlled by its individual operator in accordance with the present invention.
FIG. 2 illustrates one manner of detecting the operator's heartbeat to key a transmitter in accordance with the present invention.
Figure 4:
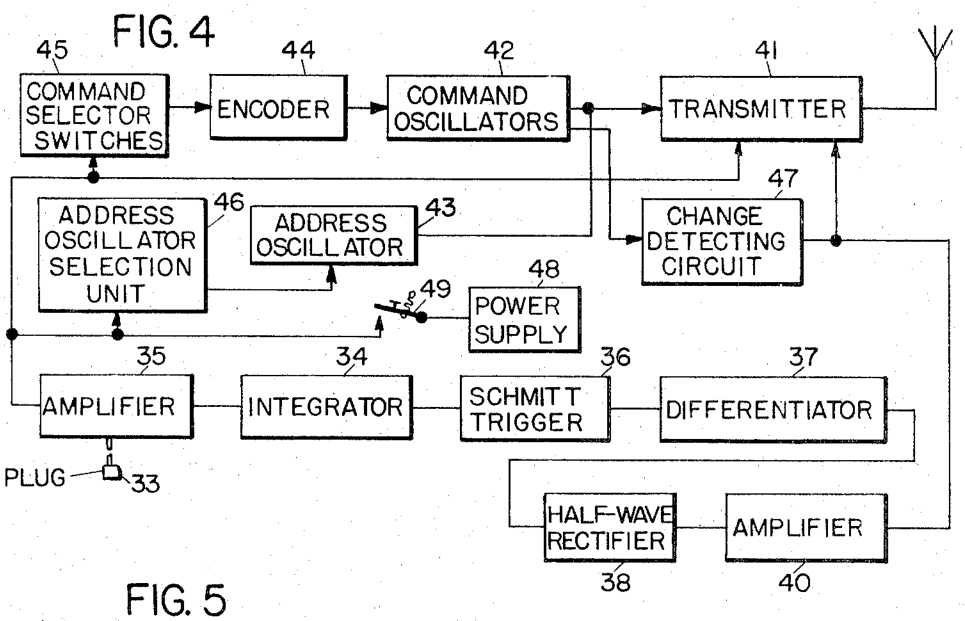
Figure 5:
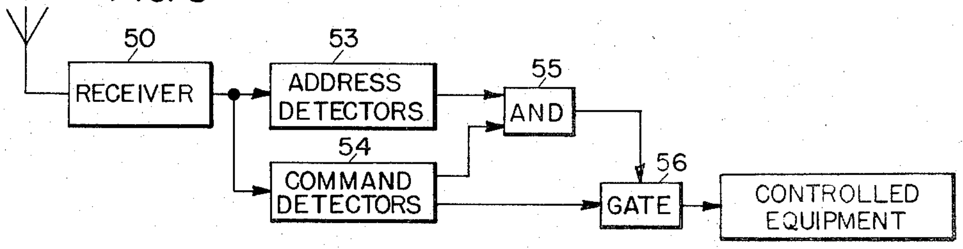

FIG. 3 illustrates another manner of detecting the heartbeat of an operator to key a transmitter in accordance with the present invention; and FIG. 4 is a simplified functional block diagram of transmitting apparatus which may be used in carrying out the method of the present invention; and FIG. 5 is a simplified functional block diagram of apparatus which may be used for receiving the bursts of frequency modulated carrier transmitted in accordance with the method of the present invention.

Referring to the drawings, FIG. 1 shows an operator 10 wearing a portable transmitting apparatus 11 fastened to his back for transmitting modulated bursts via an antenna 12 to control a locomotive 13. In one hand is a control device 14 which has a plurality of levers for transmitting the desired control by modulating the carrier with a selected combination of control tones.

The transmitting apparatus 11 is keyed in response to each heartbeat of the operator 10 to transmit short bursts of carrier frequency that are modulated by the address and control tones.

Similarly, an operator 16, who is operating locomotive 18 in close proximity to locomotive 13, has attached to his back a transmitting apparatus 20. The apparatus 20 is similar in all respects to the transmitting apparatus 11, except that each burst of modulated carrier has a different combination of address tones so as not to operate the locomotive 13, for example. The carrier frequency transmitted via antenna 21 is the same frequency transmitted via antenna 12 for the apparatus 11. Hand held device 23 selectively modulates the carrier frequency by control tones to operate the locomotive 18. The heartbeat of the operator 16 controls the rate of occurrence of the short bursts of modulated carrier transmitted by his apparatus 20.

The heartbeat of the operator 10 is illustrated as being detected by a pulse pick-up device 24 (FIGS. 1 and 3) attached to his wrist by a strap. This device may be connected to the apparatus 11 by a plug 26. The heartbeat of the operator 16 is illustrated as being detected by a microphone 28 (FIGS. 1 and 2) worn in proper position on his chest and attached to the transmitting apparatus 20 by a plug 30. The microphone 28 which may be permanently fastened to an article of clothing 31 to pick up his heart sounds, may be of the conventional type comprising a stainless steel diaphragm and a piezoelectric ceramic bonded thereto, so that when the diaphragm vibrates in response to the incident sound transmitted through the chest wall, a voltage is generated to feed a high input impedance amplifier. The device 24 detects the pulse beat of the operator 10, which produces a voltage output in response to the pulsations which corresponds to the rate of his heartbeat.

Referring to FIG. 4, the transmitting apparatus of the type carried by the operators 10 and 16 is shown in block diagram. A plug 33 is provided for connection to a device such as the microphone 28 or the pulse pick up device 24 to detect each heartbeat of the operator. In response to each heartbeat sound detected by microphone 28, for example, an output pulse is applied to an integrator 34 through the amplifier 35. Each pulse from the integrator 34 operates a trigger circuit 36, and the trigger circuit pulses are differentiated by a differentiator 37. The differentiated pulses are rectified by a rectifier 38 and amplified by amplifier 40 to key the transmitter 41. The remaining portion of the apparatus in FIG. 4 hereinafter described may be of the type similar to the hereinbefore mentioned control system, one practical embodiment of which is shown and described in U.S. patent application Ser. No. 270,751, filed on April 4, 1963, and assigned to a common assignee, to which reference is made for a more detailed description thereof.

In systems of this type, a plurality of command oscillators 42, and a plurality of address oscillators 43 are provided for transmitting modultaing signals to the transmitter 41. The selection of predetermined ones of the command modulation signals is accomplished by an encoder 44 which is controlled by a plurality of command selector switches 45, which are selectively operated by the buttons or levers on the hand held device such as 14 and 23. The selection of a predetermined address modulation signal for carrying proper address information in the transmitter output signal is achieved by constant energization of predetermined oscillators in the plurality of oscillators 43 through an address oscillator selection unit 46. A change detecting circuit 47 receives an output from the command oscillators 42 to provide a single keying pulse for the transmitter 41 whenever a new sequence of command oscillators 42 is triggered by the encoder 44. The apparatus is ready for operation when power supply 48 is connected by closing switch 49.

FIG. 5 illustrates a typical circuit organization for the reception and classification of the signal produced by the transmitting system of FIG. 4 for application to the equipment for controlling the locomotive. A receiver 50 receives a signal radiated from the transmitting system of FIG. 4 over its antenna. The output of the receiver 50 is applied in parallel to a plurality of address detectors 53 and a plurality of command detectors 54. These detectors are responsive to the modulating frequencies received by a receiver 50. The outputs from the address detectors 53 and the command detectors 54 are applied to an AND circuit 55. Assuming the presence of the proper modulating frequencies, the AND circuit 55 produces an output signal which is applied to gate 56. When the gate 56 is opened thereby, the command code is provided by the command detectors 54 is passed through the gate to the control equipment for operation thereof. A detailed explanation of the circuitry illustrated in FIG. 5 is also shown and described in the U.S. patent application hereinbefore mentioned.

Thus, there has been described in connection with a system for the tone control of a vehicle a method for reducing the probability of interference between a plurality of independent transmitter-receiver combinations operating on a single carrier frequency by using the heartbeat of the operator of each transmitter to govern the rate of occurrence of each burst of modulated information. The heartbeats of the operator are detected, and the pulses caused thereby are shaped so that they are of substantially equal width and amplitude. These shaped pulses are used to key the transmitters. Thus, each transmitter is on the air for merely a fraction of the period, or time interval between consecutive pulses, leaving the remaining time in each period for other transmissions to occur without interference from the first transmitter. An operator carrying the apparatus is in varying degrees of physical activity and mental state as he operates his particular transmitter, which causes the heart beat to at times accelerate and at other times to decelerate. However, even if one pulse should perchance interfere with another, by occurring simultaneously, the probabilities are even more remote that the next pulses will occur simultaneously from more than one transmitter. Therefore, by designing the system so that the vehicle will stop if two subsequent pulses do not reach the receiving apparatus effectively, erroneous stopping or loss of control of the vehicle is extremely remote.

In addition to providing the foregoing advantages the present invention prevents erroneous operation of the apparatus when it is not in operative position to detect the heartbeats, and also eliminates the need for a complicated electronic pulse generator in such a system.

Although one specific embodiment of the invention has been described, it is understood that the method and combination according to the present invention may be used in connection with other types of systems wherein the information is communicated by short spaced bursts of a modulated frequency; and that other means for detecting and also for converting the heartbeats into keying signals for a transmitter may be used. The form of the invention has been selected to facilitate in the disclosure of the invention rather than to limit the number of forms which it may assume; various modifications and adaptations may be applied to the specific form shown to meet the requirements of practice without in any manner departing from the spirit or scope of the present invention.

What I claim is:

1. A method of remotely operating a vehicle by a serial train of spaced bursts of a modulated carrier frequency wherein a transmitter transmits a short burst in response to each keying of the transmitter and the vehicle is operated as governed by the character of the modulated carrier frequency, detecting each beat of a living heart, producing an electrical signal in response to each detected beat, and keying the transmitter in response to each electrical signal whereby modulated carrier pulses are transmitted in response to and at the same rate as the living heart.

2. A method of keying a plurality of radio transmitters tuned to the same carrier frequency to produce from each transmitter burst of radiant energy pulses at varying repetitive rates to reduce the probability of pulses occurring simultaneously from more than one transmitter for the control of a self-powered locomotive, comprising detecting each heart beat of a plurality of living beings while each being is engaged in varying degrees of physical activity whereby the heart beats of each being is increasing and decreasing, producing a train of electrical pulses for each being occurring at the repetition rate as the heart beat of the respective being, shaping the pulses of each train, and using each train of shaped pulses to key a respective transmitter to turn the transmitter on and off upon the occurrence of each shaped pulse of its respective train, and receiving such different trains of pulses on said locomotives for the respective control thereof.

3. A method of keying a plurality of transmitters at recurring intervals to produce from each transmitter, a serial train of radiant energy information bursts that occur at varying repetition rates with respect to the rate of the pulses in each train and the pulses in different train of pulses, comprising detecting the beat of a different living heart for each transmitter, producing an electrical signal in response to each beat of each living heart, shaping each electrical signal and activating each transmitter in response to each shaped electrical signal produced by its respective living heart, whereby the probability of one transmitter transmitting its pulse simultaneously with the pulses of another transmitter is remote, and receiving said trains of information bursts on each of a plurality of self-powered vehicles for the respective control thereof by the information bursts of its respective train of bursts, and each of the vehicles stopping upon the failure to receive the bursts of its respective train.

4. A method for controlling a plurality of self-propelled objects remotely in the same general area by a common carrier frequency wherein each object is effectively controlled in response to the reception of radiant energy bursts of information recurring within predetermined time limits from its transmitter and a transmitter is provided for each object to be controlled for producing short bursts of information pulses that are modulated by a combination of address tones corresponding to its particular object and a plurality of control tones as selected by an operator, comprising detecting the heart beat of each operator, producing an electrical signal in response to each heart beat, and activating the transmitter in response to each electrical signal produced by the heart beat of its respective operator, whereby the burst of information pulses are received at varying rates within each predetermined time interval, which interval is greater than the minimum rate of heart beat of each operator.

References Cited by the Examiner

UNITED STATES PATENTS

| | | | |
|---|---|---|---|
| 2,266,401 | 12/1941 | Reeves | 325—143 |
| 3,082,414 | 3/1963 | Papaminas | 340—279 |
| 3,158,837 | 11/1964 | Bodin et al. | 340—167 |
| 3,160,711 | 12/1964 | Schroeder | 325—55 X |
| 810,730 | 3/1959 | Great Britain. | |

DAVID G. REDINBAUGH, *Primary Examiner.*

JOHN W. CALDWELL, *Examiner.*